United States Patent [19]

Sigety, Jr.

[11] Patent Number: 4,530,412
[45] Date of Patent: Jul. 23, 1985

[54] VEHICLE HOOD SUPPORT AND SECONDARY LATCH

[75] Inventor: Stephen Sigety, Jr., Mt. Clemens, Mich.

[73] Assignee: General Motors Corporation, Detroit, Mich.

[21] Appl. No.: 599,687

[22] Filed: Apr. 12, 1984

[51] Int. Cl.³ .............................................. B62D 25/10
[52] U.S. Cl. ................................... 180/69.21; 16/260; 16/361; 292/302; 292/DIG. 14; 296/76
[58] Field of Search .......................... 180/69.2, 69.21; 296/76; 292/216, 210, 302, DIG. 4; 16/260, 361

[56] References Cited

U.S. PATENT DOCUMENTS

| | | | |
|---|---|---|---|
| 2,494,347 | 1/1950 | Matthews | 16/171 |
| 2,606,625 | 8/1952 | Paton | 180/69.21 |
| 3,730,575 | 5/1973 | Arlauskas et al. | 292/DIG. 14 |
| 3,754,614 | 8/1973 | Habas | 292/302 X |
| 3,767,001 | 10/1973 | Chupick | 296/76 X |
| 4,125,170 | 11/1978 | Botz | 180/69.21 |

Primary Examiner—Joseph F. Peters, Jr.
Assistant Examiner—Michael Mar
Attorney, Agent, or Firm—Patrick M. Griffin

[57] ABSTRACT

A wrap around type hood for a vehicle engine compartment has integral fenders giving a rear edge which is curved and does not lie in a plane. A roller hinge mechanism guides the rear edge of the hood from a closed position upwardly and forwardly to an intermediate open position from where it can be rotated to a fully open position without binding the rear edge. The combined guiding support and secondary latch of the invention guides the front of the hood during this movement. A forwardly sloped open slot in a guide bracket mounted to the front of the engine compartment guides a pin on the front of the hood to guide the hood to the intermediate open position. A spring biased keeper lever pivoted to the guide bracket stays with the pin as it moves to keep it secondarily latched to the vehicle. When the keeper lever is pushed back, the hood is released to be rotated to the fully open position. When the hood is moved back to the intermediate open position the pin re-engages the keeper lever to be secondarily latched again, from which point it may be pushed back to a fully closed position.

3 Claims, 8 Drawing Figures

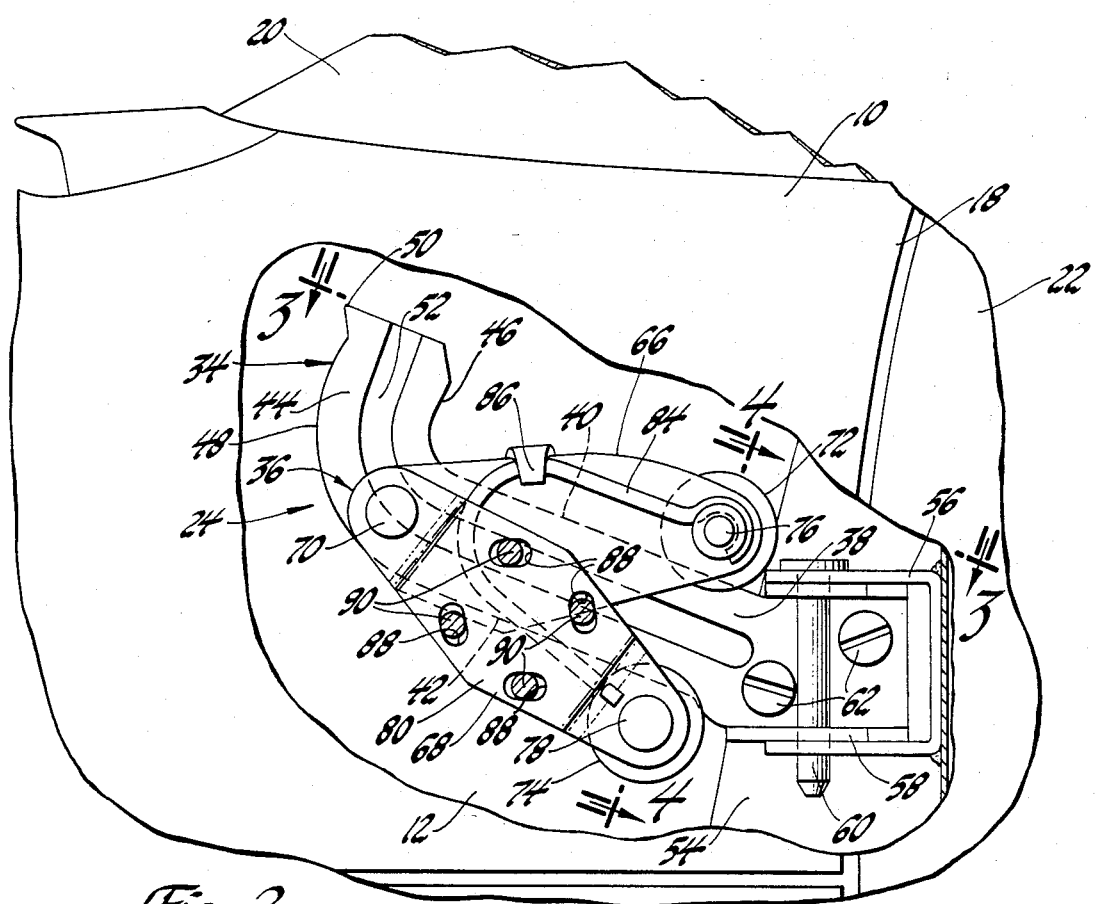
Fig. 2
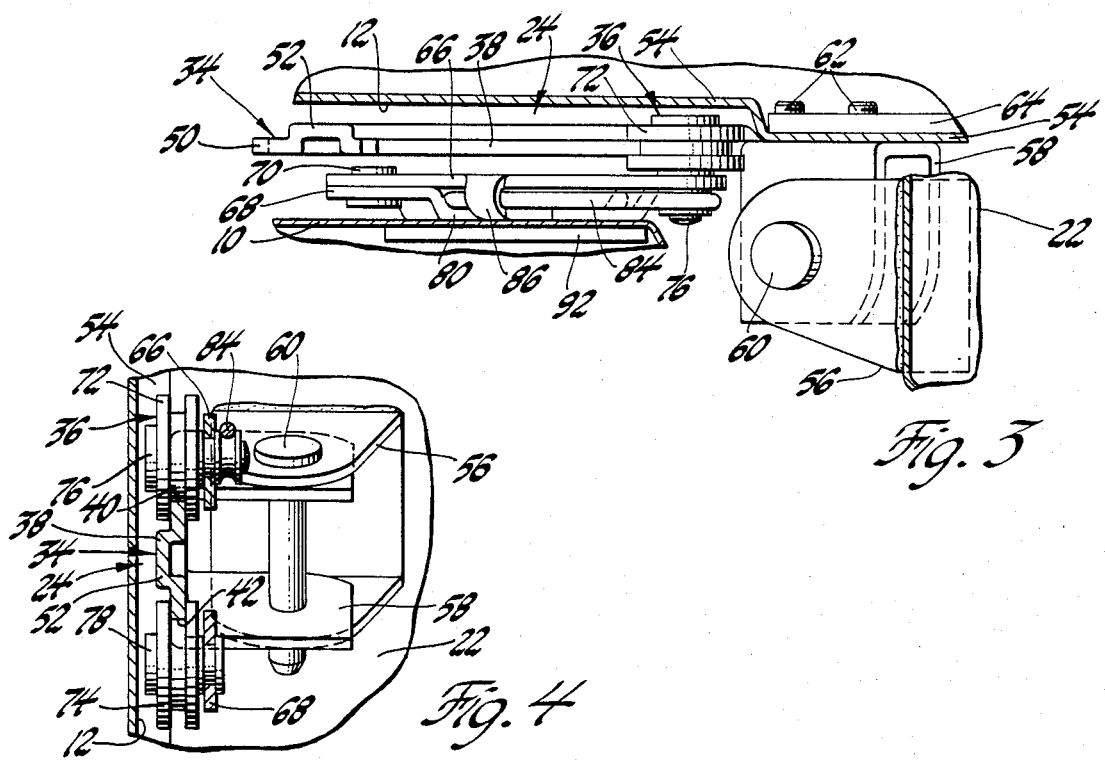
Fig. 3
Fig. 4

VEHICLE HOOD SUPPORT AND SECONDARY LATCH

This invention relates to vehicle closures or the like and specifically to a combination guiding support and secondary latch for a vehicle hood.

BACKGROUND OF THE INVENTION

Conventional vehicles generally have a substantially flat, rectangular engine compartment hood pivoted at its rear edge to the cowl structure of the vehicle near the front windshield, and latched at its front edge to the header structure of the vehicle by a remotely releasable hood latch. A resilient mechanism, generally associated with the hinges, is biased so as to pivot the hood initially up slightly upon release of the hood latch, whereupon a manually activated secondary latch releases the hood to be pivoted up farther. The hinge line between the rear edge of the hood and the vehicle cowl is essentially all in a plane, so that the initial hood movement may be simply a slight rotation up. Therefore, the hood latch at the front end of the hood essentially moves straight up and down during this initial movement, and the hood latch may be a relatively simple mechanism, such as a headed pin which fits down within a keeper. It is sometimes desirable to hinge the hood at the header, rather than the cowl, but the hinge line is again essentially all in a plane and the motion of the hood, although reversed, is similar.

In newer and smaller vehicles, it may be desirable and possible to integrate the engine hood and the front fenders. if this is done, the hinge line between the rear edge of the hood-fenders unit and the vehicle will not be all in a plane. It is, of course, possible to hinge the unit at the front edge thereof, since the line between the front of the unit and the header or front bumper is likely to be essentially planar. But if it is desired to open the hood conventionally, then it will be necessary to attach the unit by hinges which rest just beneath the cowl structure of the vehicle, as is disclosed in U.S. Pat. No. 2,606,625, to Paton. However, if it is desired to put the hinges elsewhere, a different system for hingedly supporting the unit will be necessary.

U.S. Pat. No. 2,494,347 to Matthews shows a hinge support for a curved closure over an aircraft engine which uses roller hinges to shift the hinge axis up as the closure is lifted. However, the closure is light and relatively short, and has no structure for guiding or supporting the front edge of the closure.

SUMMARY OF THE INVENTION

The subject invention provides a combined hinge guiding support and secondary latch for completely supporting and guiding a vehicle hood of the type having integrated front fenders. The invention allows the integrated hood and fender unit to be supported by hinges which are located on the same door pillar mounted hinge link as the hinge for the front door of the vehicle. This allows the doors and hood to be fitted simultaneously, but creates a hinge axis which runs through the body of the car and thus cannot be used with a conventional hood hinge and secondary latch system.

In the preferred embodiment of the invention, the rear of the hood is supported and guided by a pair of roller hinges each of which includes a guide track attached to the front door pillar and a pair of rollers attached to the hood. Each guide track includes an initial straight line portion which is sloped upwardly and forwardly with respect to the vehicle and which merges into an arcuate portion which curves upwardly.

The hood is supported at the front thereof, as well as guided thereat, by a guiding member joined at the vehicle header which has a guide slot therein sloped in the same direction as the straight line portions of the roller hinge guide tracks. A latch pin is attached to a bracket beneath the front of the hood and rides in the guide slot from the back to the open forward end thereof as the rollers of the roller hinges move along the straight line portions of the guide tracks. The hood is spring biased in the forward direction by a gas spring and a remotely releasable latch on the latching pin bracket serves to retain the latching bracket to the guiding member to maintain the hood in its fully closed position. Upon release of the latching mechanism, the spring is pushed forwardly and upwardly as the rollers move along the guide track straight portions and the latch pin rides in the guiding slot of the guiding member. The latch pin, as it rests at the forward open end of the guide slot, defines what may be termed the intermediate open position of the hood.

In addition, a secondary latch is provided by a keeper lever pivoted to the guiding member at a first end with a second end which swings in an arc from the back to the front of the guide slot. The second end also includes a generally L shaped clearance slot located just beneath a sloped striker surface, one leg of which is oriented along a radius of the arc so as to intersect the guiding member's guide slot at all points thereof. Thus, the latch pin can ride within both slots as it moves from closed to intermediate open position, with the keeper lever being maintained with and against the latch pin by a biasing spring which biases the keeper lever forward.

At the intermediate open position, the keeper lever may be manually rotated back slightly, thus freeing the latch pin and allowing the hood to be rotated up to a fully open position. During this motion, one roller of each roller hinge remains stationary at the transition point between the straight and arcuate portions of each guide track while the other roller rolls along the arcuate portion of the guide track. As the hood is moved back toward intermediate open position, the latch pin engages the striker surface of the keeper lever and rotates it back slightly toward the first point of the arc until the latch pin again enters the clearance slot. At this point, the hood may be pushed back toward its closed position, moving the keeper lever back toward the first point of the arc as the rollers roll back down the straight line portions of the guide tracks until the remote latching member is again engaged to maintain the hood in fully closed position.

It is, therefore, an object of the invention to provide a combination guide and support and secondary latch means for a vehicle hood or the like which will provide complete support and guidance for a vehicle hood as it shifts upwardly and forwardly from a closed to intermediate position.

It is yet another object of the invention to provide a combined guiding support and secondary latch means which will shift the hinge axis at the rear of the hood upwardly and forwardly while maintaining the front of the hood latched to the vehicle as the hood moves from a closed to an intermediate open position.

It is still another object of the invention to provide such a combined guiding support and secondary latch means in which the secondary latch may be easily released at the intermediate open position while the hinge supports continue to guide the hood as it moves from an intermediate to a fully open position and finally back to the fully closed position. Further features of the invention include the advantage of attaching and positioning the hood and door hinges simultaneously, as well as attaching the hood to the guide track of the hinges in one simple step after they have been so positioned, as will appear more fully in the written descriptions and the drawings below.

BRIEF DESCRIPTION OF THE DRAWINGS

FIG. 2 is an enlarged view of a portion of FIG. 1 with part of the hood broken away to show a roller hinge of the invention.

FIG. 3 is a view taken along the line 3—3 of FIG. 2.

FIG. 4 is a view taken along the line 4—4 of FIG. 2.

DESCRIPTION OF THE PREFERRED EMBODIMENT

Figure 1:
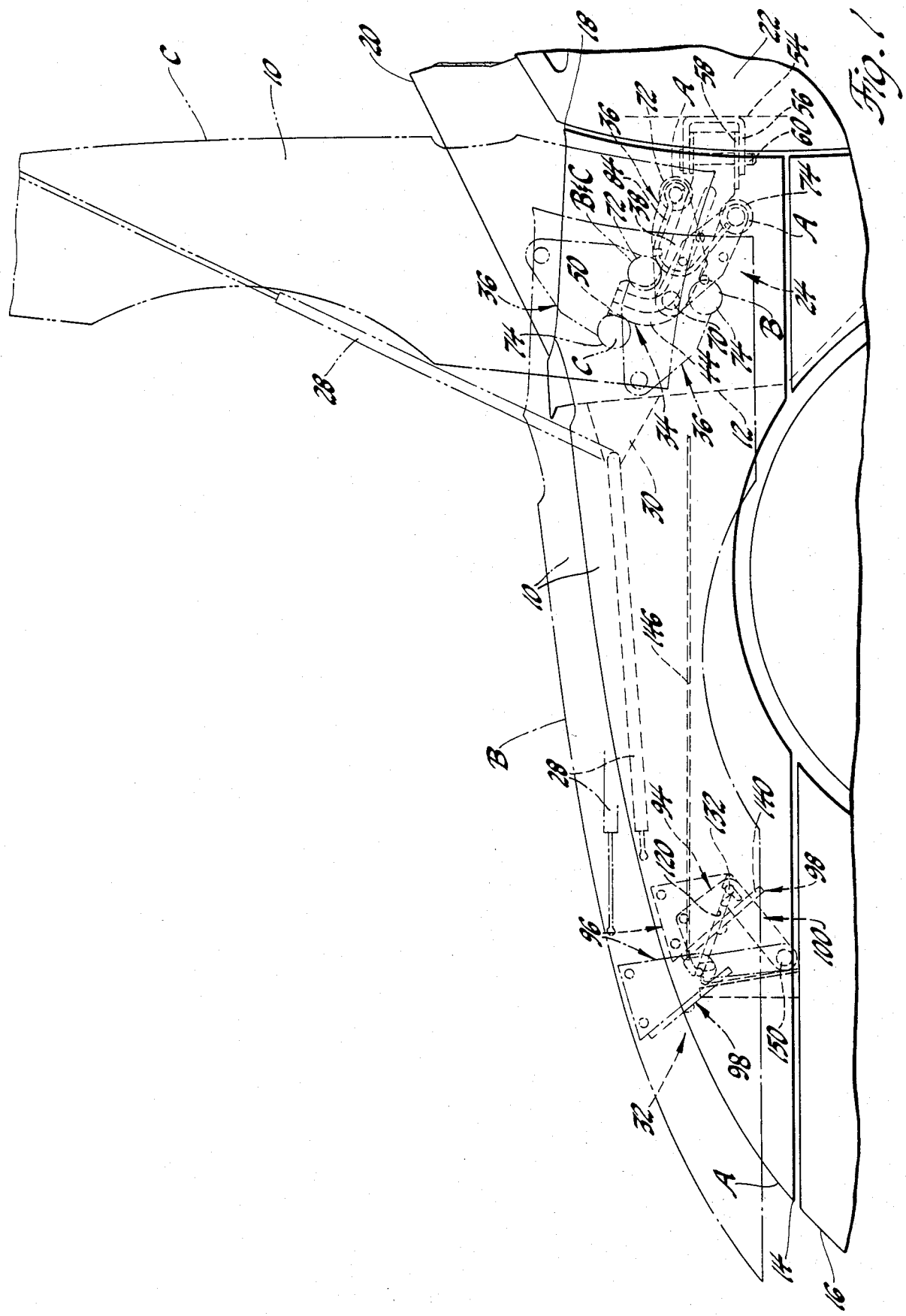
FIG. 1 is a partial view of the front of a vehicle incorporating the combined guiding support and secondary latch means of the invention.

Referring first to FIG. 1, the combined guiding support and secondary latch means of the invention is shown supporting a vehicle hood designated generally at 10 in covering relation to the engine compartment of a vehicle designated generally at 12. Vehicle hood 10 is of the wrap around type and comprises both the front fenders as well as the cover for the engine compartment. Hood 10 has a generally straight line front edge 14 which runs along header structure 16 and a curved rear edge 18 which runs below the windshield 20 as well as along the front edge of door 22. Hood 10 is shown respectively in its fully closed position A in solid lines and its intermediate open position B and fully opened position C is dash-dot lines. Hood 10 is guided and supported through these motions by the structure of the invention, which basically includes a pair of roller hinge assemblies, one of which is designated generally at 24 and a remote guiding and primary latching assembly designated generally at 32 joined to the vehicle header structure 16, more fully described below. Hood 10 shifts from fully closed to intermediate open position under the force of a gas spring 28 which is pivoted at one end on a bracket 30 joined to the inside of the engine compartment 12 and pivoted at the other end to the underside of hood 10. Gas spring 28 acts when the first, remote latch mechanism 32 is released, which is again described more fully below.

Referring now to FIG. 2, roller hinge assembly 24 includes a guide track designated generally at 34 and a roller assembly designated generally at 36. Guide track 34 is a metal stamping having a first straight track portion 38 or hood hinge portion with top and bottom parallel edges 40 and 42 extending generally in a forward longitudinal direction as well as upwardly. Straight portion 38 merges with arcuate portion 44 which has upper and lower arcuate edges 46 and 48. These extend generally upwardly and then jog sharply forwardly as they terminate at the forward end of guide track 34 to comprise a stop member 50, for a purpose which is described below. A central strengthening rib 52 runs centrally of track 34.

Guide track 34 also integrates the hood hinge with the front door upper hinge system. Referring now to FIGS. 2 and 3, details of the attachment of guide track 34 to engine compartment 12 may be seen. The track 34 includes a first hinge strap 58 or door hinge portion attached to the door pillar 54. A second hinge strap 56 is welded to door 22. The door is installed on the vehicle by positioning hinge straps 56, 58 together to be interconnected by pin 60. Strap 58 is attached along with the lower end of guide track 34 to pillar 54 by a pair of bolts 62 threaded into a weldment 64 on the inside of pillar 54. Thus, both hinge strap 58 and guide track 34 may be positioned simultaneously. This creates a hinge axis which shifts in order to open hood 10.

Roller assembly 36, which cooperates with guide track 34, consists of upper and lower leaves 66 and 68 which are joined together at one end in scissors-like fashion by pin 70. Each leaf 66 and 68 has a grooved roller 72 and 74 respectively attached to the other end thereof by pins 76 and 78, as may be seen in FIG. 4. As best seen in FIG. 3, upper leaf 66 is flat while lower leaf 68 is formed with an offset portion 80 to leave space for a tension spring 84. Spring 84 has one end hooked around pin 76 and the other inserted through leaf 68. A bent over tab 86 on leaf 66 helps to maintain spring 84 in place. Spring 84 keeps rollers 72 and 74 securely biased against edges 40 and 42, as may be best seen in FIG. 4. In addition, lower leaf 68 contains four elongated holes 88 which receive four attachment members, such as bolts 90, which are threaded into a weldment 92 to join hood 10 to lower leaf 68. Spring 84 also allows the two rollers 72 and 74, after attachment of leaf 68 to hood 10, to be fed onto arcuate portion 44 and then onto the straight portion 38 at assembly, and likewise removed later if desired.

Referring to FIG. 1, it may be seen how the roller assemblies 36 and guide tracks 34 cooperate to guide and support the rear of hood 10 and to move the hinge axis thereof. From the fully closed position A, upon release of the latch of assembly 32, gas spring 28 pushes hood 10 longitudinally forwardly and vertically upwardly as roller 72 rolls along edge 40 and stops at the transition of edge 40 and edge 46, thereby defining the intermediate open position B. At position B, the hinge axis has shifted forwardly and upwardly sufficiently to allow hood 10 to be opened farther without interference with door 22. From position B, hood 10 may be rotated farther to a fully open position C, during which motion roller 72 remains in its last position and roller 74 rolls along arcuate lower edge 48 until it engages stop member 50, at which point gas spring 28 may act as a prop for hood 10. This motion is reversed as hood 10 is closed. During the motion from position A to position B, it is necessary to guide, support and secondarily latch the front of hood 10, as will be discussed more fully below.

Referring now to FIGS. 5-8, the front of hood 10 is guidingly supported by a guiding member designated generally at 94 in cooperation with a latching member designated generally at 96. Hood 10 is moved by gas spring 28 from position A to position B upon the activation of a first latch means designated generally at 98. The first or primary latch means is operable from the passenger compartment by hood release cable 146. Hood 10 is released to move from position B to position C, not shown in FIGS. 5-8, upon release of a secondary latch means designated generally at 100 which cooperates with the guide member 94. The secondary latch means is generally a spring biased keeper lever 148 accessible beneath the front of the hood when the hood is in position B. Details of these structures are described below.

Guiding member 94 consists of a sheet metal bracket 102 with two sides folded over at seam 104 and closely spaced in parallel relation. Seam 104 is welded to a generally clevis shaped mounting bracket 106 which is in turn attached by any suitable means to header structure 16, thus placing guiding member 94 near the front of hood 10. A pin 108 helps maintain the sides of bracket 102 rigidly together. An open ended guide slot 120 cut through both sides of bracket 102 extends longitudinally forwardly and vertically upwardly of vehicle 10.

Figure 5:
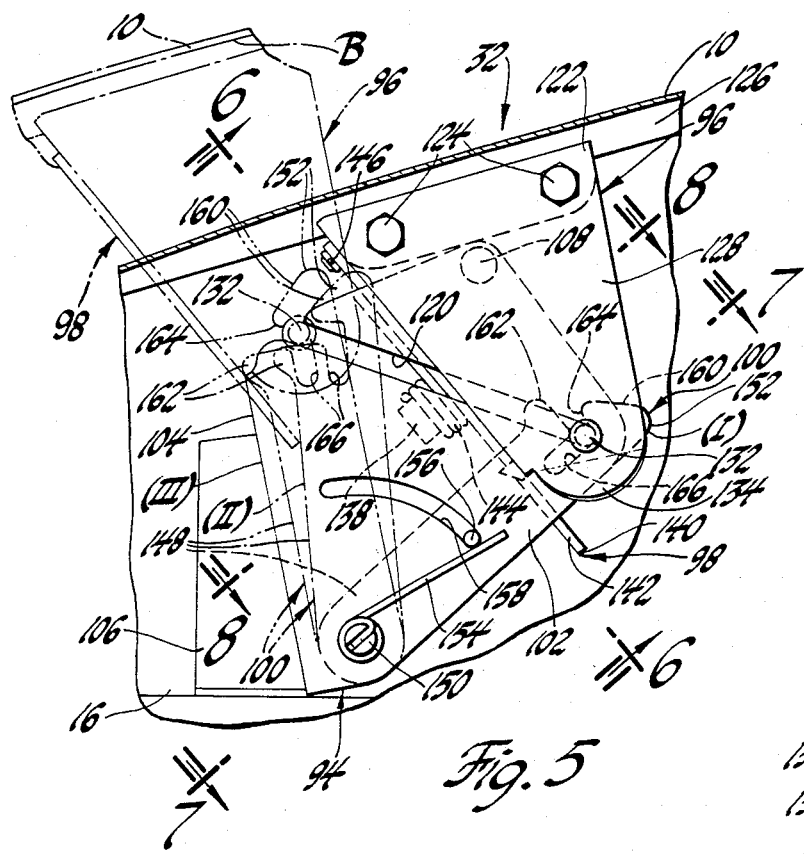
FIG. 5 is an enlarged view of a portion of FIG. 1 showing the guiding member and keeper lever of the invention in a hood fully closed and locked position, or intermediate hood open position, and a manual hood release position.
Figure 6:
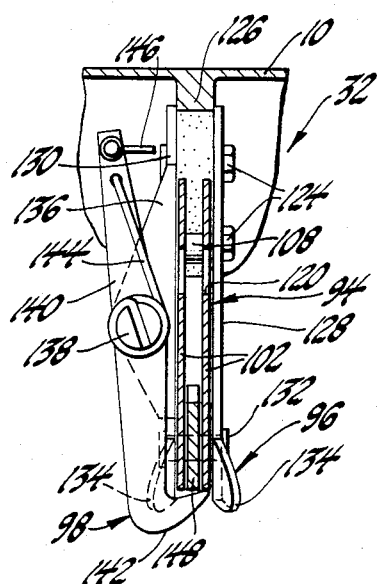
FIG. 6 is a view taken along the line 6—6 of FIG. 5.
Figure 7:
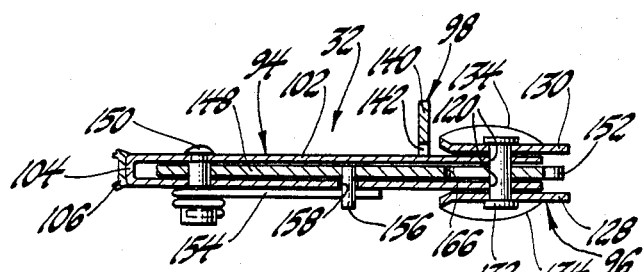
FIG. 7 is a view taken along the line 7—7 of FIG. 5.
Figure 8:
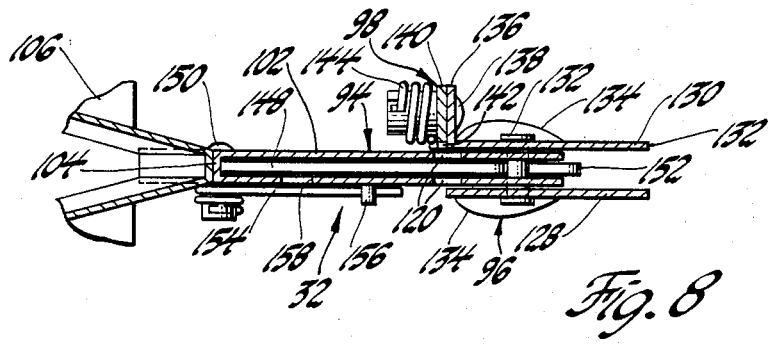
FIG. 8 is a view taken along the line 8—8 of FIG. 5.

Latching member 96 includes a generally clevis shaped bracket 122 attached by bolts 124 to rib 126 on the underside of hood 10. Bracket 122 has spaced apart walls 128 and 130 with a latching or keeper pin 132 joined therebetween near the outwardly flared ends 134 thereof. Latching pin 132 rides in the guide slot 120 moving from position I to position III as the hood 10 moves from position A to position B, thereby providing guidance to the front of hood 10. In addition, the wall 130 has a bent over tab 136 to which is pivoted, on pin 138, a hood release latch lever 140 having hooked end 142 and biased by spring 144 in a counterclockwise direction, as viewed in FIG. 6. This is part of the first latch means generally operable from the passenger compartment. When hood 10 is in its fully closed position, hooked end 142 engages the back of bracket 102, as seen in FIG. 5. A cable 146 joined to the other end of lever 140, when pulled from the passenger compartment, releases hood 10 to move, under the force of gas spring 28, to the B position of FIG. 5.

As previously mentioned, it is necessary to secondarily latch hood 10 to engine compartment 12 during this A to B motion, and a conventional secondary or safety latch will not work because of the combined forward and upward motion of the hood. The secondary latch means of the invention includes a keeper lever designated at 148 which has a first end pivoted by pin 150 between the walls of bracket 102. Free second end 152 of lever 148 swings in an arc about pin 150 from the closed to the open end of guide slot 120, in effect the cord of the arc. Spring 154 wrapped around pin 150 bears against a small pin 156 which passes through a matching arcuate slot 158 in bracket 102. This continually biases keeper lever 148 forwardly or toward the open end of guide slot 120. As seen in FIG. 5, the second end 152 of the lever includes at the radial outermost edge thereof a striker surface 160 which is sloped toward a protruding catch or guiding surface 162. Also, an open keeper slot 164 runs between striker surface 160 and catch 162 where it intersects with the radially outermost open end of a generally radially extending clearance slot 166 to form a generally L shaped slot.

The operation of roller hinge assemblies 24 and guiding member 94 in cooperation with latching pin 132 have already been described as hood 10 moves from position A to position B. During this motion, as seen in FIG. 5, latching pin 132 moves from position I to position III, and the rearward edge of clearance slot 166 is maintained in engagement with latching pin 132 by the biasing action of spring 154. Latching pin 132 moves down and back up in clearance slot 166 with the top edge of keeper slot 164 always resting over pin 132 and acting as a keeper surface to keep hood 10 latched to engine compartment 12. At position III, the open end of clearance slot 166, of guiding slot 120, and pin 132 are all coincident, and keeper lever 148 may be manually pushed back to the dotted line position II. This will remove pin 132 from keeper slot 164 and allow hood 10 to be rotated farther up to the fully open position C, as shown in FIG. 1. Keeper lever 148 will spring back to position III when it is not being pushed back, i.e. upon its release. As hood 10 is again rotated down toward the B intermediate open position, latching pin 132 will engage and move past striker surface 160 to push keeper lever 148 back toward position II until it hits catch 162, at which point spring 154 will push keeper slot 164 back over latching pin 132. From there, hood 10 is pushed back manually to position A with latching pin 132 carrying keeper lever back to position I until the hooked end 142 of hood release latch lever 140 again engages the back of, bracket 102.

Therefore, it may be seen that all the structures described cooperate to guide and support hood 10 through its various motions, while keeping it secondarily latched. It will be understood that the invention described is capable of other embodiments and it is not to be limited to the embodiment disclosed herein.

The embodiments of the invention in which an exclusive property or privilege is claimed are defined as follows:

1. A combination guiding support and secondary latch means for use in combination with a vehicle closure or the like having a first portion hingedly supported to the vehicle and resiliently biased to move the closure longitudinally forwardly and vertically upwardly of the vehicle, upon release of a primary latch means, from a closed to an intermediate open position, comprising, a guiding member joined to the vehicle at a location longitudinally spaced from the closure first portion and having a guide slot therein extending longitudinally and vertically upwardly relative to the vehicle to an open end, a latch member joined to the closure and slidably movable within the guide slot to the open end thereof to guide and support the closure, in combination with the hinge support of said first portion, as the closure moves from the closed to the intermediate open position upon release of the primary latch means, said secondary latch means being cooperable with the guide member to releasably maintain the closure to the vehicle in the intermediate open position, and including keeper lever having a first end pivoted to the guiding member and a second end swingable in an arc from a first point in the guide slot to a second point at the open end of the guide slot, the keeper lever second end further including a clearance slot in which the latch member is receivable and intersecting the guide slot as the keeper lever moves at all points of the arc, and having a radially outermost slot end coincident with the open end of the guide slot at the second point of the arc when the closure is in the intermediate open position, biasing means acting between the guide member and the keeper lever to resiliently urge the keeper lever toward the second point of the arc to maintain an edge of the clearance slot engaged with the latch member as the closure moves from the closed to the intermediate open position, the keeper lever second end further including an open keeper slot in which the latch member is receivable and extending generally normal to the clearance slot from the radial outermost end thereof, the radial outermost edge of the keeper slot defining a keeper surface extending a first distance over the latching member at the second point of the arc to maintain the closure latched to the vehicle at the intermediate open position, with the other edge of the keeper slot extending a greater second distance beneath the latching member to define a guiding surface, and the keeper lever second end further including a striker surface sloped toward the guiding surface of the keeper slot and terminating at the keeper surface, whereby movement of the keeper lever back toward the first point of the arc against the urging of the biasing means clears the keeper surface from the latching member to allow the closure to move further vertically upward relative to the vehicle from the intermediate open position, and movement of the closure back toward the intermediate open position slidably moves the latching member past the striker surface against the urging of the biasing means until the latching member hits the guiding surface of the keeper slot and the biasing means moves the keeper surface back over the latching member, and movement of the closure back toward the closed position carries the keeper lever with the latching member back to the first point of the arc until the primary latch means may be re-engaged.

2. A combination guiding support and secondary latch means for use in combination with vehicle hood and door hinge portions wherein said means has a first portion hingedly supported to the vehicle hood hinge portion for mounting the hood and resiliently biased to move the hood longitudinally forwardly and vertically upwardly of the vehicle hood hinge portion, upon release of a primary latch means, from a closed to an intermediate open position and having a second portion hingedly supported to the vehicle door hinge portion for mounting the door, comprising, a guiding member joined to the vehicle at a location longitudinally spaced from the first portion and having a guide slot therein extending longitudinally and vertically upwardly relative to the vehicle to an open end, a latch member joined to the hood and slidably movable within the guide slot to the open end thereof to guide and support the hood, in combination with the first portion, as the hood moves from the closed to the intermediate open position upon release of the primary latch means, said secondary latch means being cooperable with the guide member to releasably maintain the hood to the vehicle at the intermediate open position, including a keeper lever having a first end pivoted to the guiding member and a second end swingable in an arc from a first point in the guide slot to a second point at the open end of the guide slot, the keeper lever second end further including a clearance slot in which the latch member is receivable and intersecting the guide slot as the keeper lever moves at all point of the arc, and having a radially outermost slot end coincident with the open end of the guide slot at the second point of the arc when the hood is in the intermediate open position, biasing means acting between the guide member and the keeper lever to resiliently urge the keeper lever toward the second point of the arc to maintain an edge of the clearance slot engaged with the latch member as the hood moves from the closed to the intermediate open position, the keeper lever second end further including an open keeper slot in which the latch member is receivable and extending generally normal to the clearance slot from the radial outermost end thereof, the radial outermost edge of the keeper slot defining a keeper surface extending a first distance over the latching member at the second point of the arc to maintain the hood latched to the vehicle at the intermediate open position, with the other edge of the keeper slot extending a greater second distance beneath the latching member to define a guiding surface and, the keeper lever second end further including a striker surface sloped toward the guiding surface of the keeper slot and terminating at the keeper surface, whereby movement of the keeper lever back toward the first point of the arc against the urging of the biasing means clears the keeper surface from the latching member to allow the hood to move further vertically upward relative to the vehicle from the intermediate open position, and movement of the hood back toward the intermediate open position slidably moves the latching member past the striker surface against the urging of the biasing means until the latching member hits the guiding surface of the keeper slot and the biasing means moves the keeper surface back over the latching member, movement of the hood back toward closed position carries the keeper lever with the latching member back to the first point of the arc until the primary latch means may be re-engaged, said first and second portions of said guiding support and secondary latch means being joinable as a unit to said vehicle for attaching and positioning the vehicle hood hinge portion and vehicle door hinge portion so that said hinge portions may be positioned and attached simultaneously as a unit to said vehicle.

3. A combination guiding support and secondary latch means for use in combination with a vehicle closure or the like having a first portion hingedly supported to the vehicle and resiliently biased to move longitudinally forwardly and vertically upwardly of the vehicle, upon release of a primary latch means from a closed to an intermediate open position, comprising, a guiding member joined to the vehicle at a location longitudinally spaced from the closure first portion and having a guide slot therein extending longitudinally and vertically relative to the vehicle to an open end, a keeper pin joined to the closure and slidably movable within the guide slot to the open end thereof to guide and support the closure, in combination with the hinge support of said first portion, as the closure moves from the closed to the intermediate open positions, said secondary latch means being cooperable with the guide member to releasably maintain the closure to the vehicle at the intermediate open position, and including a keeper lever having a first end pivoted to the guiding member and a second end swingable in an arc from a first point in the guide slot to a second point at the open end of the guide slot, the keeper lever second end further including a clearance slot in which the keeper pin is receivable and intersecting the guide slot as the keeper lever moves at all points of the arc, and having a radially outermost slot end coincident with the open end of the guide slot at the second point of the arc when the closure is in the intermediate open position, biasing means acting between the guide member and the keeper lever to urge the keeper lever toward the second point of the arc to maintain an edge of the clearance slot engaged with the keeper pin as the closure moves from a closed to an intermediate open position, the keeper lever second end further including an open keeper slot in which the keeper pin is receivable and extending generally normal to the clearance slot from the radial outermost end thereof, the radial outermost edge of the keeper slot defining a keeper surface extending a first distance over the keeper pin at the second point of the arc to maintain the closure latched to the vehicle at the intermediate open position and, the keeper lever second end further including a striker surface sloped toward the open keeper slot and terminating at the keeper surface, whereby movement of the keeper lever back toward the first point of the arc against the urging of the biasing means cleans the keeper surface from the keeper pin to allow the closure to move further vertically relative to the vehicle from the intermediate open position, and movement of the closure back toward the intermediate open position slidably moves the keeper pin past the striker surface against the urging of the biasing means until the keeper pin is adjacent the open keeper slot so that the biasing means moves the keeper surface back over the keeper pin, and movement of the closure back toward closed position carries the keeper lever with the keeper pin back to the first point of the arc whereupon the primary latch means may be reengaged.

* * * * *